United States Patent
Macrina

[19]

[11] Patent Number: 6,062,166
[45] Date of Patent: May 16, 2000

[54] PET FEEDING SYSTEM

[76] Inventor: John L. Macrina, 8100 SW. 93rd Ave., Miami, Fla. 33173

[21] Appl. No.: 09/243,402

[22] Filed: Feb. 1, 1999

[51] Int. Cl.⁷ ....................................................... A01K 5/02
[52] U.S. Cl. ........................................................... 119/51.11
[58] Field of Search ............................ 119/51.11, 51.12, 119/51.15, 52.1, 53, 56.1

[56] References Cited

U.S. PATENT DOCUMENTS

| | | | |
|---|---|---|---|
| 3,665,224 | 5/1972 | Kelsey | 307/311 |
| 3,742,913 | 7/1973 | Crippen | 119/51.11 |
| 4,181,097 | 1/1980 | Betsuno | 119/51.11 |
| 4,279,221 | 7/1981 | Arvizu | 119/51.11 |
| 4,422,409 | 12/1983 | Walker et al. | 119/51.11 |
| 4,688,520 | 8/1987 | Parks | 119/51.11 |
| 4,782,790 | 11/1988 | Batson | 119/51.11 |
| 5,230,300 | 7/1993 | Mezhinsky | 119/51.11 |
| 5,299,529 | 4/1994 | Ramirez | 119/51.11 |
| 5,363,805 | 11/1994 | Wing | 119/51.11 |
| 5,370,080 | 12/1994 | Koepp | 119/51.11 |
| 5,483,923 | 1/1996 | Sabbara | 119/51.11 |
| 5,533,648 | 7/1996 | Read et al. | 119/56.1 |
| 5,873,326 | 2/1999 | Davet et al. | 119/245 |

*Primary Examiner*—Thomas Price
*Attorney, Agent, or Firm*—Joseph N. Breaux

[57] ABSTRACT

An automatic pet feeder system which allows a user to monitor the operation of the pet feeding and determine whether or not the pet feeding system is operating normally by placing a phone call to his or her house. The invention includes both a water reservoir and food reservoir which are each in connection with a separate bowl while monitoring sensors in the reservoirs and bowls determine the level of food and/or water and which when necessary indicate through a monitoring circuit to a controller to actuate an inlet valve to allow either food or water to enter into the appropriate bowl. The control circuit includes a telephone relay disconnect with an inlet and outlet telephone line while a regular telephone answering machine is attached to an outlet line from the automatic feeder so that when an interruption in the systems's operation is encountered the telephone answering machine is disconnected through the relay alerting the user to a feeding system malfunction. A timing device is provided in line with the control circuitry and provides a device for releasing food into the reservoirs at a given time. An auxiliary power battery is provided in line with conventional AC power cord for powering the system.

4 Claims, 2 Drawing Sheets

PET FEEDING SYSTEM

TECHNICAL FIELD

The present invention relates to devices and methods for automatic pet feeders and more particularly to devices and methods for an automatic pet feeding system that comprises a metered and monitored system in connection with a water reservoir, watering bowl, food reservoir, and food bowl and a monitoring circuit including a disconnect relay having a plug that is positioned in line with a telephone line of a household answering machine while the system's monitoring circuit monitors the level of food and water within the respective reservoirs and bowls and also indicates whether programmed feeding and watering have taken place on time and whether an error exists in the operation of the unit so that a person may monitor the operation of the system by placing a telephone call to the household to determine if the system has malfunctioned.

BACKGROUND ART

There have been numerous automatic pet feeders described and patented which include various levels of automation. These automatic pet feeders are useful for their stated purposes however there has never been an automated pet feeding system as the present which allows a user to monitor the operation of the pet feeding system by placing a telephone call to one's house. The prior art patents which describe various automatic pet feeders are as follows: Wing, U.S. Pat. No. 5,363,805, Sabbara, U.S. Pat. No. 5,483,923, Koepp, U.S. Pat. No. 5,370,080, Ramirez, U.S. Pat. No. 5,299,529, Mezhinsky, U.S. Pat. No. 5,230,300, Batson, U.S. Pat. No. 4,782,790, Parks, U.S. Pat. No. 4,688,520, Walker, et al, U.S. Pat. No. 4,422,409, Arvivu, U.S. Pat. No. 4,279,221, Betsuno, U.S. Pat. No. 4,181,097, Crippen, U.S. Pat. No. 3,742,913, and Kelsey, U.S. Pat. No. 3,665,224.

As will be shown from the description herein the present invention allows the user of the automatic pet feeder system to monitor the operation of the pet feeding and determine whether or not the pet feeding system is operating normally. The invention accomplishes this by providing both a water reservoir and food reservoir which are each in connection with a bowl while monitoring sensors in the reservoirs and bowls determine the level of food and/or water and which when necessary indicate through a monitoring circuit to a controller to actuate an inlet valve to allow either food or water to enter into the appropriate bowl. The reservoir levels are monitored with similar monitoring sensors and are further provided with level indicator lights. The control circuit includes a telephone relay disconnect with an inlet and outlet telephone line while a regular telephone answering machine is attached to an outlet line from the automatic feeder so that when an interruption in the systems's operation is encountered the telephone answering machine is disconnected through the relay alerting the user to the feeding system malfunction. A timing device is provided in line with the control circuitry and provides a means for releasing food into the reservoirs at a given time. An auxiliary power battery is provided in line with conventional AC power cord for powering the system.

GENERAL SUMMARY DISCUSSION OF INVENTION

It is thus an object of the invention to provide a Pet Feeding System that allows a user to monitor the operation of the system by placing a phone call to his/her house.

It is a further object of the invention to provide a Pet Feeding System that includes both a water reservoir and a water bowl and a food reservoir and food bowl.

It is a still further object of the invention to provide a Pet Feeding System that includes level monitored food and water reservoirs and food and water bowls.

It is a still further object of the invention to provide a Pet Feeding System that includes a times release water and food pet feeding system that releases either food and/or water at a set time desired by the user while the levels of the food and water are monitored and further where reservoirs for each the food and water are monitored in connection with the bowls allowing automatic and incremental additions of food and/or water as needed during the day.

It is a still further object of the invention to provide a Pet Feeding System that comprises a telephone relay disconnect circuit with both an inlet and outlet phone connection providing a connection for a normal home telephone answering machine and a connection for a telephone line at a home so that when a user calls home the telephone answering machine at the user's home will answer when the pet feeding system is in normal operation however when the pet feeding system has malfunctioned, the telephone disconnect relay is activated thereby disconnecting the answering machine and alerting the user to the pet feeding system's malfunction.

Accordingly, a Pet Feeding System is provided which comprises a water reservoir in connection with a water bowl, a food reservoir in connection with a food bowl, sensors and circuitry in connection with the food and water bowls and food and water reservoirs monitoring the levels of both the reservoirs and bowls, a valve positioned between the water reservoir and the water bowl, a valve positioned between the food reservoir and food bowl, both valves in electrical connection with a control box, wherein said control box is further in connection with a monitoring circuit which is in connection with the sensors and further in connection with a telephone line at the user's household and telephone line in connection with the user's telephone answering machine, a timer in connection with the control box which allows a user to adjust for an appropriate time for release of either the water and/or food into the bowls and an auxiliary power supply in connection with a normal household AC power source.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that a user who owns a pet and would like to be sure that the pet receives food and water on a regular basis would utilize the pet feeding system by first filling the feeding system's reservoirs. Food is added to the food reservoir through a lid while water is added to a similar reservoir. Next the user would connect his/her incoming telephone line to the feeding system and connect his/her telephone answering machine to the female telephone jack on the feeding system.

The user would then set the timer and clock on the feeding system to release food and water at a certain time. The pet feeding system also includes food and water reservoir and bowl sensors which are electrically connected to a monitoring circuit which intern sends a signal to a control circuit which activates valves positioned between the reservoirs and bowls thereby providing automatic food and/or water release into the bowls.

Figure 1:
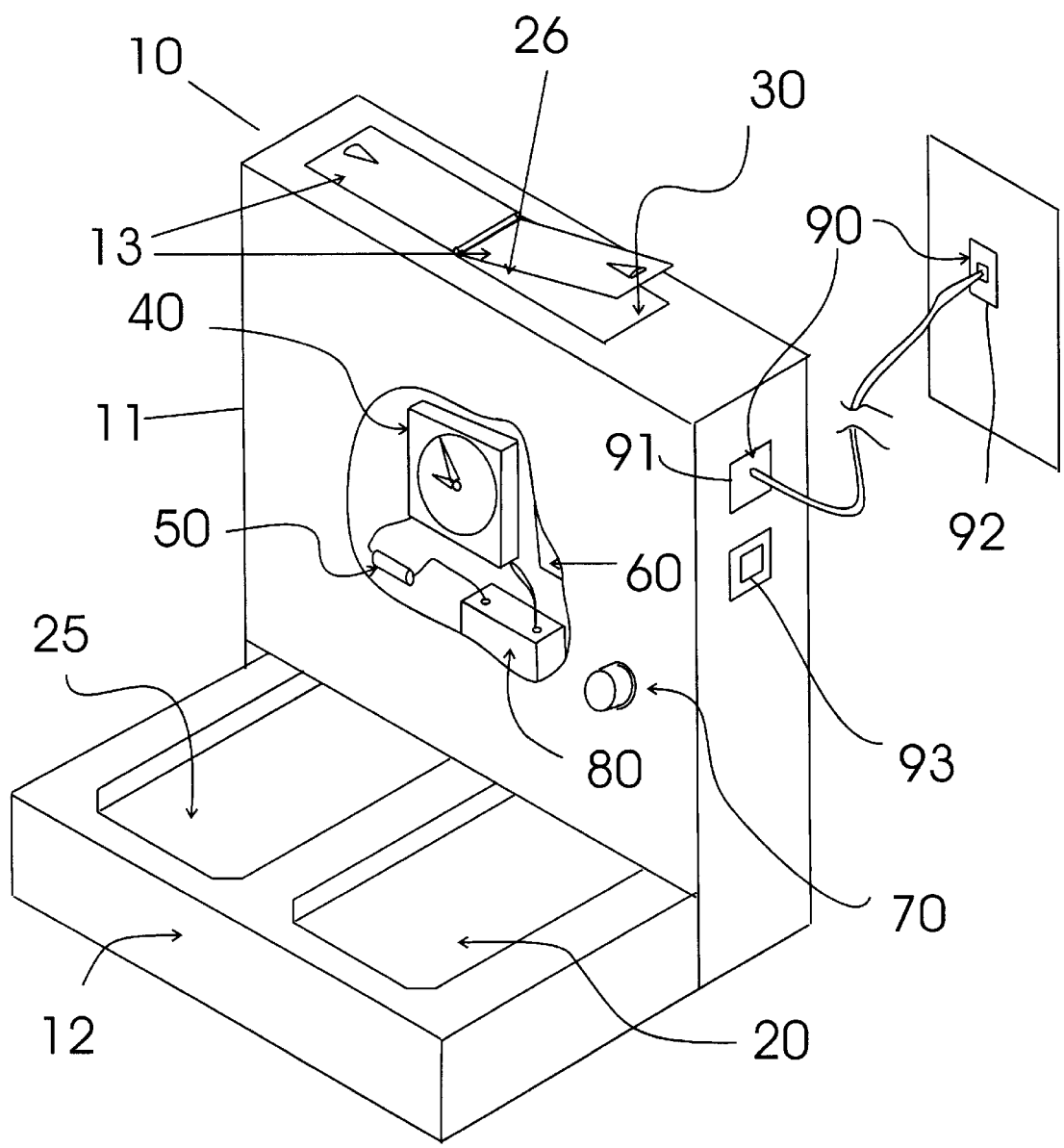
FIG. 1 is an isometric view of the pet feeding system with cutaway portions showing the internal components.
Figure 2:
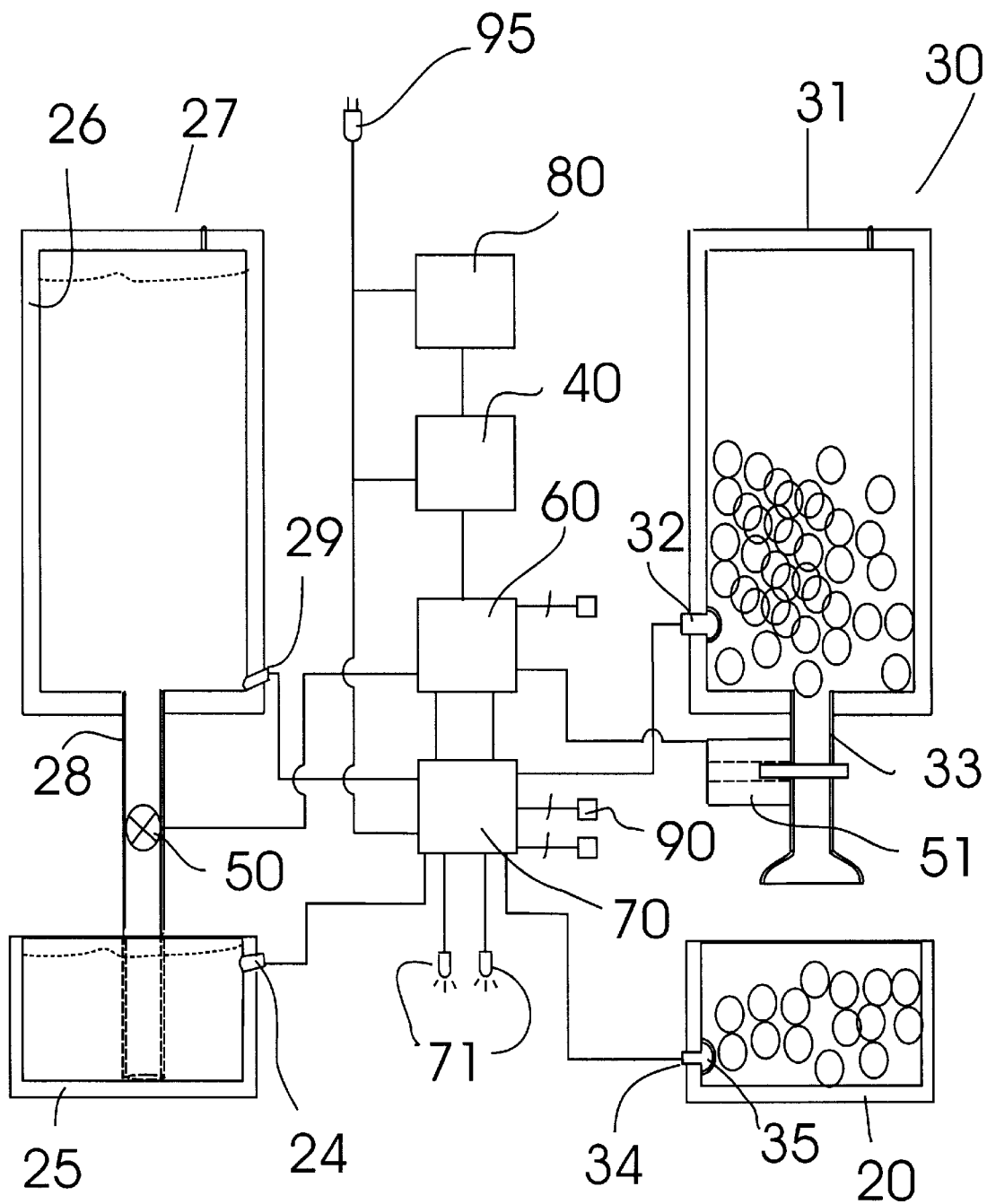
FIG. 2 is a schematic of the control circuits, reservoirs and sensors, food and water bowls and sensors, and other components therein.

Referring to the figures in detail, FIG. 1 illustrates the pet feeding system generally 10 which is housed within an upright cabinet type case 11 with a lower portion 12 containing both the food bowl 20 and water bowl 25. The cabinet 11 includes two hinged tops 13 positioned on a top edge of the cabinet and which hinged lids 13 provide entry so that the food 30 and water 26 reservoirs may be accessed for filling. The cabinet also contains the electrical circuitry including the timer 40, solenoid valves 50, control circuitry 60, monitoring circuitry 70, auxiliary power 80, and telephone inlet/outlet connectors including circuitry 90.

The water reservoir 26 includes an entry cap 27 for filling the reservoir while a water passage way 28 extends from a lower portion of the water reservoir to the water bowl 25. A water reservoir level sensor 29 is positioned at a lower end of the reservoir and is in electrical connection with the monitoring circuit 70. The water bowl 25 also includes a water level sensor 24 which is also in electrical connection with the monitoring circuit 70. The water level sensors are preferably sensors which complete a circuit when the water level is at or above the water level sensors. The water acts as a conductor for completing the circuit in the sensors. Accordingly, the water level sensor 24 in the water bowl is positioned near a top portion of the water bowl so that when the water level in water bowl is at or above the sensor the sensors electrical circuit is complete when the water bowl is substantially full of water conversely, the water sensor level 29 in the reservoir is positioned at a lower end of the reservoir so that the circuit in the sensor is completed only when water is present within the reservoir. When water in the reservoir goes below the sensor monitoring circuit sends an electrical signal to level indicator lights 71 to alert the user that the level in the reservoir is low. A solenoid valve 50 is positioned on the water passage way between the reservoir and the bowl and is activated by the control circuitry 60 whenever the water level indicator sensor 24 in the bowl indicates that water should be added to the bowl or when the timer and clock circuit 40 indicates to the controller that it is time for watering. Additionally, the water bowl level sensor 24, when the water in the bowl is above the sensor and when a timer and clock indicator will not send a signal to the control circuit 60 for adding more water. Food reservoir 30 includes an entry cap 31 food level sensor 32 positioned near a bottom end of the food reservoir, food passage way extending from a bottom portion of the food reservoir and positioned above the food bowl so that when food passes from the reservoir through the passage way it empties into the food bowl 20. A solenoid gate valve 51 is positioned on the food passage way 33 for controlling the flow of food through the passage way. A food level indicator 34 is positioned on a lower end of the food bowl 20. The food level indicators 34 and 32 are preferably pressure sensitive sensors so that when food is present in either the bowl or the reservoir, the sensors 32 and 34 indicate the presence of food by physical contact of the food with a depressible sensor cover 35. When food is depressing the sensor in either the reservoir or the bowl a signal is sent to the monitor indicating to the circuitry that food is present in both the reservoir and the bowl. When food is not present in the bowl and is present in the reservoir, a signal is sent to the monitoring circuit 70 which intern sends a signal to the control circuitry 60 which intern sends an electrical signal to solenoid gate valve 51 for activating the valve and allowing food to pass from the food reservoir into the food bowl. The monitoring circuit 70 includes a food level indicator light 71 which indicates to the user that food is present in the reservoir and the system is ready for operation.

A telephone call receiving circuit 90 which includes a inlet phone jack 91 for connecting the telephone call receiving circuitry to a house telephone jack 92 while a telephone outlet jack 93 provides a connection port for a household telephone answering machine. In normal use, when a user calls home the feeding system circuitry allows the telephone answering machine to answer the telephone call. When either bowl is empty, the monitoring circuit will send an electrical signal to an internal telephone disconnect relay which does not allow an incoming phone call to be answered by the answering machine. The telephone answering machine will not answer when either the food bowl or the water bowl are empty, this would only occur if one or of both of the reservoirs is empty and/or if a malfunction has occurred for opening one of the valves in the passage ways between the reservoirs and the bowls. The user would then be alerted that his/her pet is either without food or water and would then have an opportunity to remedy the situation.

The pet feeding system is powered by conventional AC current by a plug 95 rechargeable battery 80 provides auxiliary power when electrical power is interrupted at the house.

It is noted that the embodiment of the Pet Feeding System described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Pet Feeding System comprising:

a) a water reservoir and a water bowl, a passageway extending from a lower end of the water reservoir and to the water bowl while a water valve is positioned in the passageway to control the flow of water through the passageway, a water level sensor positioned near the lower end of the water reservoir and which sensor completes a circuit when the water level in the reservoir reaches a level above the sensor, a water bowl level sensor positioned near a bottom of the water bowl and said water bowl sensor completes a circuit when the water level in the bowl reaches a level above said water bowl sensor, b) a food reservoir and a food bowl, a passageway extending from a lower end of the food reservoir and to the food bowl while a food valve is positioned in the passageway to control the flow of food through the passageway, a food level sensor positioned near the lower end of the food reservoir and said food reservoir sensor completes a circuit when the food level in the reservoir reaches a level below the sensor, a food bowl sensor positioned near a bottom of the food bowl and said food bowl sensor completes a circuit when the food level in the bowl reaches a level below said food bowl sensor, c) an electrical timer and clock, d) a monitoring circuit which receives electrical input from the water reservoir and bowl sensors, from the food reservoir and bowl sensors, and receives an electrical input from a telephone receiving circuit, and which sends electrical signals to the telephone receiving circuit and to visual operation indicator lights which illuminate when the reservoirs are empty, e) a control circuit which receives signals from the monitoring circuit, the electrical timer and clock, and which sends electrical signals to the valves positioned in the passageways which control the flow of water or food into the respective bowls when one of the following occurs; the food and water bowl level sensors indicate that either food or water levels are low, the timer and clock reaches a preset time for feeding, and f) a telephone call receiving circuit and relay including an inlet telephone connection for connecting an incoming telephone line and an outlet telephone connection for connecting a telephone answering machine, and said call receiving circuit allows a user to call his or her home to monitor the operation of the feeding system so that when all of the food and water reservoir and bowl sensors indicate that they are not empty the telephone call receiving circuit and disconnect relay will allow an incoming call to be answered by the answering machine and if either one of the food or water reservoir or bowl sensors indicate that one is empty then the telephone call receiving circuit and disconnect relay will not allow an incoming call to be answered by the answering machine thereby alerting the user that the feeding system is either empty or has malfunctioned.

2. The Pet Feeding System of claim 1, wherein the reservoirs and the circuitry is contained within a single feeding system cabinet.

3. The Pet Feeding System of claim 1, wherein the control circuit further comprises a manual operation switch which allows a user to manually operate either the water or food valve.

4. The Pet Feeding System of claim 1 wherein the circuitry further comprises an auxiliary power supply which comprises a rechargeable battery.

\* \* \* \* \*